May 12, 1959     F. J. BRAGA     2,886,654
EQUIVALENT FOUR-WIRE REPEATERS
Filed Dec. 15, 1955     4 Sheets-Sheet 1
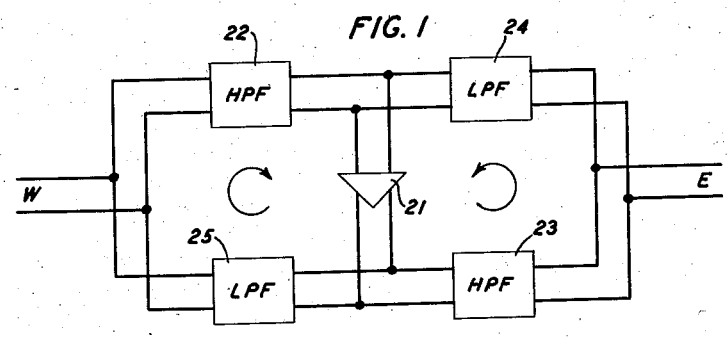
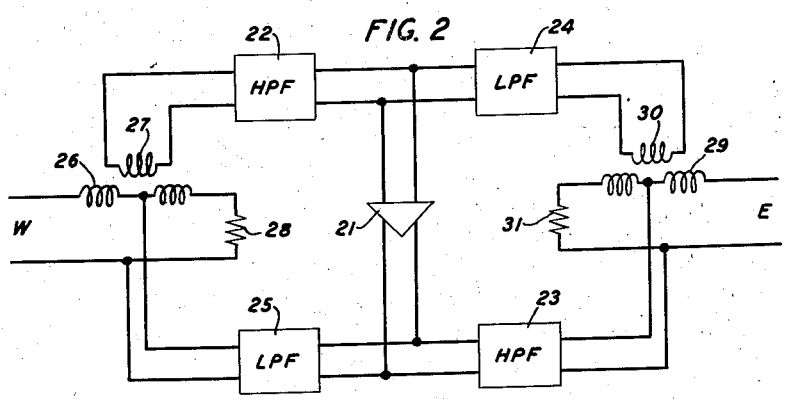
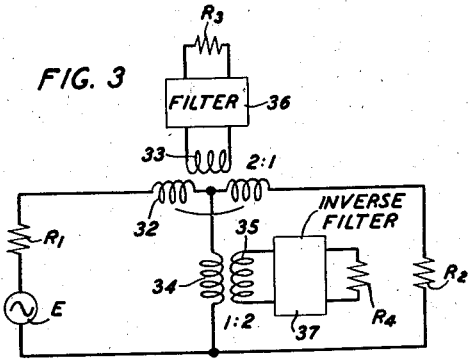
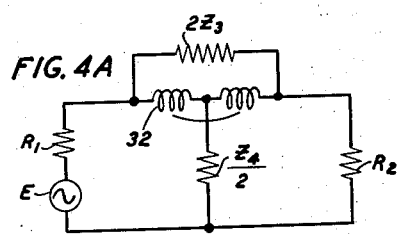
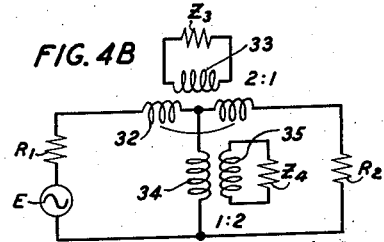
INVENTOR
F. J. BRAGA
BY R. B. Ardis
ATTORNEY May 12, 1959  F. J. BRAGA  2,886,654
EQUIVALENT FOUR-WIRE REPEATERS
Filed Dec. 15, 1955  4 Sheets-Sheet 2

INVENTOR
F. J. BRAGA
BY
R. B. Ardis
ATTORNEY

May 12, 1959  F. J. BRAGA  2,886,654
EQUIVALENT FOUR-WIRE REPEATERS
Filed Dec. 15, 1955  4 Sheets-Sheet 3

INVENTOR
F. J. BRAGA
BY
R. B. Ardis
ATTORNEY

May 12, 1959 F. J. BRAGA 2,886,654
EQUIVALENT FOUR-WIRE REPEATERS
Filed Dec. 15, 1955 4 Sheets-Sheet 4

INVENTOR
F. J. BRAGA
BY R. B. Ardis
ATTORNEY

United States Patent Office 2,886,654
Patented May 12, 1959

2,886,654
EQUIVALENT FOUR-WIRE REPEATERS

Felix J. Braga, Morristown, N.J., assignor to Bell Telephone Laboratories, Incorporated, New York, N.Y., a corporation of New York Application December 15, 1955, Serial No. 553,388

13 Claims. (Cl. 179—170)

This invention relates generally to repeaters of the equivalent four-wire or 21-type and more particularly, although in its broader aspects not exclusively, to equivalent four-wire or 21-type repeaters for use in long submarine cable systems.

In a carrier signal transmission system, it is frequently desirable to transmit on a two-wire basis and provide repeaters using a single one-way amplifier for both directions of transmission. This is particularly true in a long submarine cable system since a cable failure in a system of two cables equipped with equivalent four-wire repeaters disables only half of the circuits, while in a physical four-wire system all circuits are lost. Also, if the growth rate is low, additional circuits may be added most economically with the equivalent four-wire system.

A repeater commonly used under such circumstances is the so-called 21-type repeater which, in its simplest form, includes high-pass and low-pass filters connected between the input side of the one-way amplifier and the respective two-wire lines and similar high-pass and low-pass filters connected between the output side of the amplifier and the opposite ones of the respective two-wire lines. In a system using such a repeater, different frequency bands are used for the two directions of transmission and, in the repeater, carrier signals traveling in one direction are routed through the one-way amplifier by way of the high-pass filters while those traveling in the opposite direction are routed by way of the low-pass filters.

Unfortunately, a 21-type repeater such as that which has been described includes a pair of inherent feedback paths outside of the one-way amplifier. Each of these feed-back paths includes a respective high-pass and low-pass directional filter connected in series between the input and output sides of the amplifier. In a long system, they impose relatively severe discrimination requirements on the filters. In the first place, the filters must introduce a sufficient amount of loss outside of their pass bands in these feedback loops to provide a satisfactory margin against singing. Since feedback tends to alter the gain of the amplifier, however, even more important is the requirement that the filter losses outside of their pass bands be high enough so that the deviation or misalignment of the entire system is kept within reasonable limits. This second requirement is particularly severe in long submarine cable systems, since not only is the number of repeaters relatively large but there is also little chance to equalize for misalignment at regular intervals. Since filters with high discrimination between frequencies within and without their nominal pass bands tend to be complex and, in a number of respects, less reliable than simpler filters, any relatively simple way of relaxing such discrimination requirements without at the same time sacrificing repeater performance would be highly advantageous.

In the past, the usual approach to the problem has been to use hybrid connections at the junctions between the directional filters and the two-wire lines. The balance attained in this manner does serve to reduce the filter discrimination requirements to acceptable levels. At the same time, however, a flat loss of about three decibels is added for each hybrid used, reducing the gain available for distortion-reducing amplifier feedback, decreasing the required repeater spacing in a long system, and aggravating misalignment problems. In addition, the use of hybrids affects adversely the impedance match between the 21-type repeater and the two-wire transmission lines to which it is connected. Because at each end of the repeater the impedance of one filter in its pass band approximates a pure resistance and the impedance of the other filter in its stop band approximates a pure reactance, the impedance presented by the hybrid cannot match the cable, which has an impedance approximating a pure resistance at carrier frequencies.

A principal object of the present invention, therefore, is to reduce filter discrimination requirements in a 21-type repeater without incurring the flat loss penalty occasioned by the use of hybrids.

Another object is to improve the impedance match between the respective ends of a 21-type repeater and the two-wire cables to which they are connected.

In its principal aspect, the invention takes the form of a two-way carrier repeater for use between a pair of two-wire transmission line sections which includes a one-way amplifier, bridged-T networks having respectively inverse filter circuits with like pass bands as their bridging impedance and shunt branches, respectively, connected between transmission line sections and respectively opposite sides of the one-way amplifier, and connections between both filter circuits of each bridged-T network and the side of the amplifier opposite to that to which the bridged-T network itself is connected. On each side of the repeater, the filters making up the respective bridging impedance and shunt branches of the bridged-T network are inverse to one another in that, at any frequency, the impedance presented by one filter is substantially equal to $R^2/Z$, where Z is the impedance presented at the same frequency by the other filter and R is the midband resistance presented by both filters within their common pass band. Structurally, each series-arm capacitor in one filter is represented by a shunt-arm inductor in the other, each series-arm inductor in one filter is represented by a shunt-arm capacitor in the other, each series-arm combination of a capacitor and an inductor in series in one filter is represented by a shunt-arm combination of a capacitor and an inductor in parallel in the other, and so on.

In a two-way repeater embodying the present invention, frequencies within the pass band of the respective inverse filters on one side of the repeater are transmitted between the line and the side of the one-way amplifier to which the filters are connected and are blocked from the other side. Frequencies outside of the pass band of the filters, on the other hand, are transmitted through the bridged-T network itself between the line and the other side of the amplifier. These latter frequencies are, in turn, blocked from the side of the amplifier to which the filters are connected.

From one point of view, the present invention provides most of the advantages of the use of hybrids to assist the band-splitting filters in a 21-type repeater without any of the major disadvantages. Each bridged-T network of the type featured provides a balance analogous to that provided by a conventional hybrid connection, thus permitting relaxation of filter discrimination requirements. At the same time, however, each network feeds the outputs of both of its inverse filters to the one-way amplifier, thus avoiding the flat loss introduced by the arrangements found in the prior art. The relaxed filter discrimination requirements afforded by the invention permit the use of somewhat simpler filter structures which are, in turn, more reliable than more complex structures for the reason that there are fewer elements in which failures can occur. The possibility of misalignments caused by variations in elements due to temperature variations and aging is reduced in the same way. Finally, the avoidance of the introduction of transhybrid loss by the invention results in a retention of full amplifier gain to provide both distortion-reducing feedback within each repeater and the maximum possible repeater spacing.

In addition to the advantages which have already been enumerated, the present invention provides a considerably improved impedance match between the 21-type repeater and a resistive line. Since the filters in each of the bridged-T networks on either side of a 21-type repeater embodying the invention are inverse, the bridged-T network operates to present an impedance to the line which is substantially a pure resistance both within and without the pass band of the filters. The close impedance match to the line thereby made possible is particularly advantageous because of its effect in minimizing the troublesome interaction ripples which tend to occur in a long system.

A more complete understanding of the invention may be obtained by the following detailed description of the most pertinent prior art and a number of specific embodiments of the invention. In the drawings:

Fig. 1 illustrates the standard 21-type carrier repeater found in the prior art;

Fig. 2 shows how hybrid connections may be applied to the 21-type repeater of Fig. 1 in order to relax filter discrimination requirements;

Fig. 3 illustrates a bridged-T band-splitting network of the general type used in embodiments of the present invention;

Figs. 4A and 4B are equivalent circuits showing the basis for the bridged-T network of Fig. 3;

Figure 12A:
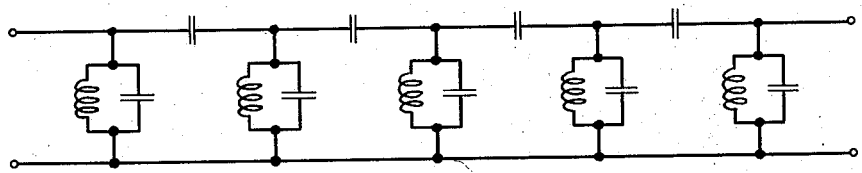
Figure 12B:
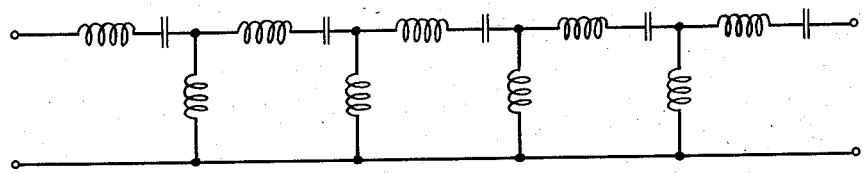
Figure 13:
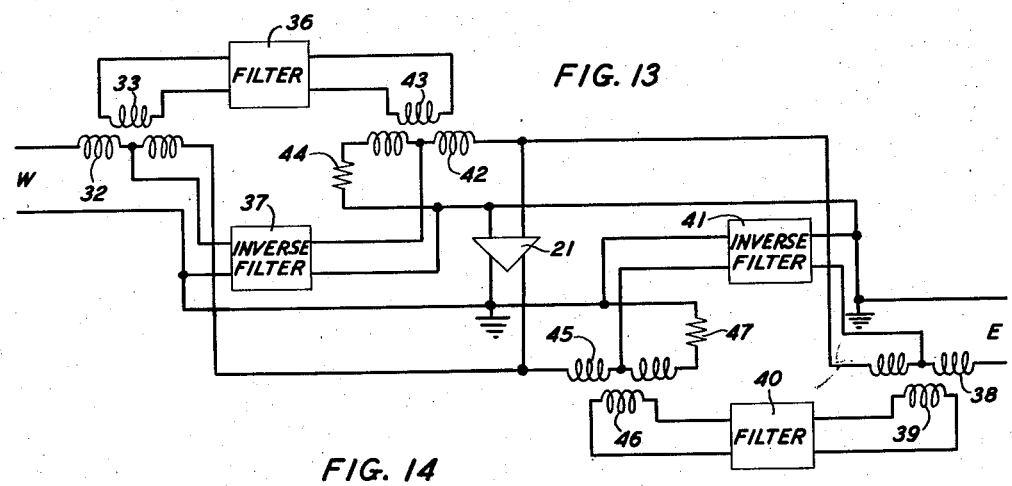
Figure 14:
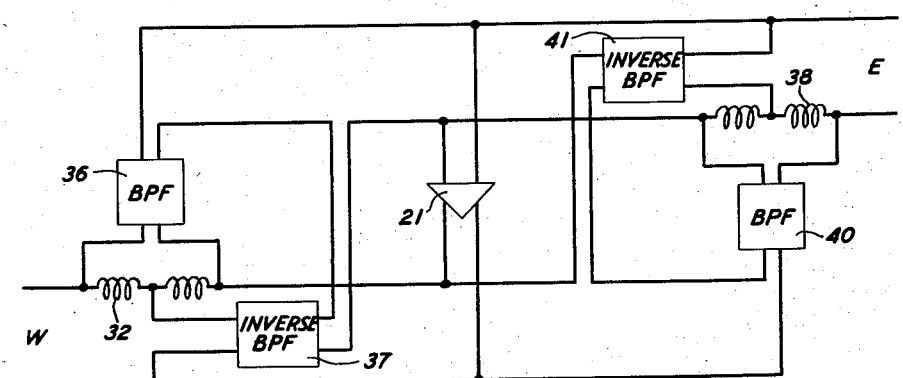

Figs, 11A and 11B show respectively inverse low-pass filter circuits for use in embodiments of the invention;

Figs. 12A and 12B show respectively inverse band-pass filter circuits for use in embodiments of the invention;

Fig. 13 illustrates an embodiment of the invention which provides substantially pure resistances facing the one-way amplifier used in the repeater as well as substantially pure resistances facing the external sections of two-wire line; and Fig. 14 illustrates an embodiment of the invention in which band-pass filters are used to minimize the elements required in the individual bridged-T band-splitting networks.

The standard 21-type carrier repeater shown in Fig. 1 includes a pair of two-way transmission line sections labeled W and E, respectively, a single one-way amplifier 21, a high-pass filter 22 interconnecting line W with the amplifier input, a high-pass filter 23 interconnecting the amplifier output with line E, a low-pass filter 24 interconnecting line E with the amplifier input, and a low-pass filter 25 interconnecting the amplifier output with line W. The filters are paralleled at the line connections and split the operating band of the system in two, the high band being that transmitted from W to E and the low band that transmitted from E to W. With such an arrangement, the filters can readily be made to present substantially a pure resistance to the external lines. Because of the inherent feedback paths between the amplifier output and input provided by the respective high-pass and low-pass filters (and indicated by the arrows), however, it can be shown that the filter discrimination requirements are impracticable in a tandem operated system including a large number of repeaters. In addition, modulation requirements tend to be severe because high level signals from the amplifier output are connected directly to the low level points of the oppositely directed paths.

Fig. 2 represents a partial solution to the above problems that has frequently been used in the prior art. At the junction with line W, a hybrid connection is provided consisting of a pair of transformer windings 26 and 27 and a terminating resistor 28. Winding 26 is connected in one side of the line and winding 27 is connected across high-pass filter 22. The output of low-pass filter 25 is connected across line W from the mid-point of winding 26 to the other side of the line. At the junction with line E, a similar hybrid connection is provided, with transformer windings 29 and 30 and terminating resistor 31 corresponding to windings 26 and 27 and resistor 28, respectively, at the junction with line W.

In the prior art arrangement illustrated in Fig. 2, advantage is taken of the hybrid balances to reduce the suppression requirements around the feedback loops. At both ends of the repeater the connections to the respective high-pass and low-pass filters are conjugate to one another, causing transmission from high-pass to low-pass filters, and vice versa, to be blocked. The frequency discrimination characteristics of the filters are not, therefore, relied upon exclusively to separate one band from another and control the direction of transmission through amplifier 21. There is, however, a flat six decibel loss introduced by the hybrid connections. This loss, plus the loss through the filters, makes a total which is a high price to pay for reduced filter discrimination requirements.

The bridged-T network illustrated in Fig. 3 is a constant resistance circuit of the type which was first disclosed in United States Patent 2,044,047, issued June 16, 1936, to S. Bobis. In its simplest form as shown, it includes a first transformer having a primary winding 32 and a secondary winding 33, a second transformer having a primary winding 34 and a secondary winding 35, and a pair of inverse filter circuits 36 an 37. The two transformers have turns ratios from their primary windings to their secondary windings of 2:1 and 1:2, respectively, and filter circuits 36 and 37 have substantially identical pass bands. Filter circuits 36 and 37 differ from one another in that their structures are respectively inverse. In other words, to derive one from the other, each series-arm capacitor is replaced by a shunt-arm inductor, each series-arm inductor is replaced by a shunt-arm capacitor, each series-arm combination of a capacitor and an inductor in series with one another is replaced by a shunt-arm combination of a capacitor and an inductor in parallel with one another, and so on. At any frequency, the impedance presented by one filter is substantially equal to $R^2/Z$, where Z is the impedance presented at the same frequency by the other filter and R is the mid-band resistance presented by both filters in their common pass band.

In the bridged-T network of Fig. 3, primary winding 32 is connected in series with one side of the incoming line (represented by the source resistance $R_1$ in series with a voltage E), primary winding 34 is connected between the mid-point of winding 32 and the opposite side of the line, secondary winding 33 is connected across the input side of filter 36, secondary winding 35 is connected across the input side of filter 37, a load resistor $R_2$ is connected across the output of the bridged-T network, and a pair of load resistors $R_3$ and $R_4$ are connected across the output sides of filters 36 and 37, respectively. The impedances presented to secondary windings 33 and 35 by filters 36 and 37 are $Z_3$ and $Z_4$, respectively.

The circuit of Fig. 3 is based upon the equivalence of the bridged-T networks shown in Figs. 4A and 4B, both of which illustrate the impedance relationships existing in the former. As long as the impedances $Z_3$ and $Z_4$ are inverse to one another, the bridged-T network presents a substantially constant resistance on either side at substantially all frequencies of interest. Transmission to the various load resistances is then frequency dependent and determined by the kind of filters chosen. The power delivered in Fig. 3 to the various load resistors is given by the expression $$P_1 = P_2 + P_3 + P_4$$

where $P_1$ is the power in $R_1$, $P_2$ is the power in $R_2$, and so on. At frequencies at which $Z_3$ and $Z_4$ are resistive in nature, the power is split between $R_3$ and $R_4$ and no power is transmitted to $R_2$. At frequencies at which $Z_3$ and $Z_4$ are reactive, on the other hand, all of the power is transmitted to $R_3$ and none is transmitted to $R_3$ and $R_4$.

Figure 5A:
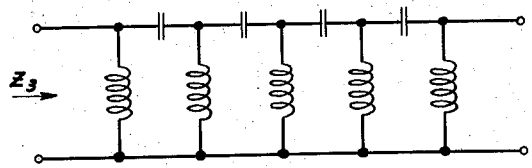
Figs. 5A and 5B show mutually inverse high-pass filter circuits for use in embodiments of the present invention.
Figure 5B:
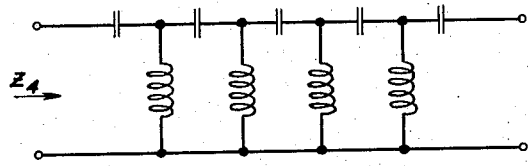

A pair of inverse high-pass filter circuits suitable for use as filters 36 and 37 in the bridged-T network of Fig. 3 are illustrated in Figs. 5A and 5B, respectively. As shown, each shunt-arm inductance in the filter shown in Fig. 5A corresponds to a series-arm capacitor in the inverse filter shown in Fig. 5B, while each series-arm capacitor in Fig. 5A corresponds to a shunt-arm inductor in Fig. 5A. Both filters have substantially the same cut-off frequency $f_c$.

Figure 6:
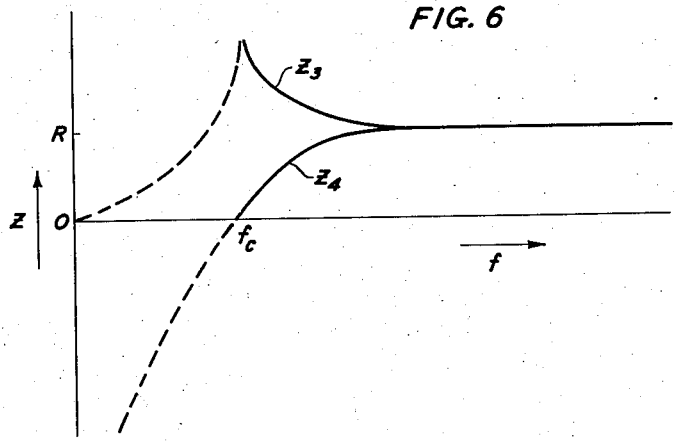
Fig. 6 illustrates the manner in which the impedances of the filter circuits of Figs. 5A and 5B vary with frequency.

Impedance-versus-frequency curves for the inverse high-pass filters of Figs. 5A and 5B are shown in Fig. 6, where the upper curve represents $Z_3$, the impedance presented to secondary winding 33 by filter 36, and the lower curve represents $Z_4$, the impedance presented to secondary winding 35 by filter 37. Both filters present an impedance which is resistive (solid line) in their pass bands (at frequencies above $f_c$) and an impedance which is reactive (dashed line) in their stop bands (at frequencies below $f_c$).

When the inverse high-pass filters shown in Figs. 5A and 5B are used as filters 36 and 37 in the bridged-T network of Fig. 3, $R_3$ and $R_4$ receive no power from zero frequency to the filter cut-off frequency $f_c$, since $Z_3$ and $Z_4$ are reactive. All of the power is transmitted from $R_1$ directly to $R_2$. At cut-off, half the power is in $R_2$ and the other half is split between $R_3$ and $R_4$. As the frequency is increased, $Z_3$ and $Z_4$ approach R and $R_2$ receives less and less power. Finally, when $Z_3$ and $Z_4$ are both equal to R, there is no power transmitted to $R_2$. In effect, therefore, the bridged-T network of Fig. 3 constitutes a band-splitting filter, the low-pass path being from $R_1$ to $R_2$ and the high-pass path being from $R_1$ to $R_3$. One of the difficulties with this circuit, however, is that part of the power in the high-pass path is dissipated in the resistance $R_4$, resulting in a difference in level of approximately three decibels between the high-pass and low-pass paths.

Figure 7:
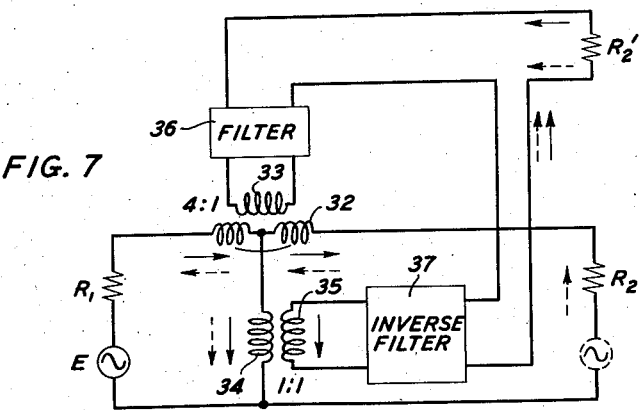
Fig. 7 illustrates the operation of the bridged-T band-splitting network used in embodiments of the invention.

In accordance with an important feature of the invention, the outputs of inverse filters 36 and 37 in the bridged-T network of Fig. 3 are connected together, permitting band splitting without the usual three decibel loss and permitting the circuit to be employed to fix the paths of oppositely directed signals in a 21-type carrier repeater. Fig. 7 illustrates this aspect of the invention and, in addition, shows the manner in which currents add and subtract in various parts of the circuit.

In Fig. 7, $R_3$ and $R_4$ have, in effect, been connected in series and replaced by a single load resistance $R_2'$. The transformer turns ratios are changed to 4:1 and 1:1, respectively, so that the effective resistances seen by the transformer primaries are the same as before. The instantaneous current directions at frequencies within the pass band of inverse filters 36 and 37 are indicated by the solid arrows. As illustrated, the currents add at $R_2'$. In other words, the band-splitting properties of the circuit are the same as before except that all instead of only part of the energy in the filter pass band is delivered to $R_2'$. All of the energy in the filter stop band is, as before, delivered to $R_2$. In this manner, band splitting is achieved without the usual three decibel loss.

It is of additional interest to examine what happens when the voltage generator in Fig. 7 is transferred from $R_1$ to $R_2$. The instantaneous current directions within the pass bands of the filters under such circumstances are shown by the dashed arrows. Since the currents cancel at $R_2'$, the required balance between the respective in and out of band loops is maintained.

Figure 8:
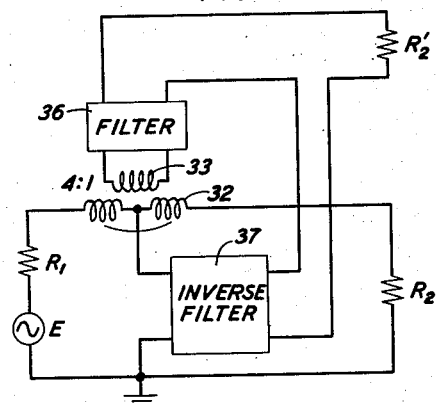
Figs. 8 and 9 illustrate how the outputs of the inverse filters in each bridged-T band-splitting network in embodiments of the invention may be connected in series or in parallel, respectively.

The transformer in the shunt branch of the bridged-T band-splitting network of Fig. 7 can be removed without disturbing the circuit, as shown in Fig. 8. Such an arrangement, when used in accordance with the present invention to control transmission through a 21-type repeater, permits one side of the one-way amplifier to be operated at ground potential. One of the filters, however, must still be operated off ground.

As has already been pointed out, the band-splitting bridged-T network illustrated in Fig. 8 offers a number of advantages for equivalent four-wire repeater applications. In the first place, the use of such a circuit permits transmission around the usual high-pass low-pass inherent feed-back loop in a 21-type repeater to be substantially blocked without the usual three decibel flat loss occasioned by the use of conventional hybrids. The resulting balance reduces the frequency discrimination requirements of the filters. In the second place, on ground operation of the one-way amplifier is permitted. In the third place, the circuit requires only a single filter design. Once a single filter (such as the one shown in Fig. 5A, for example) has been designed, its inverse can be obtained by inspection. Finally, a good impedance match to the line on both sides of a 21-type repeater embodying the invention is obtained. A constant resistance is presented to the line by the repeater and, since the impedances of transmission lines with which such a repeater is likely to be used are resistive in the usual carrier frequency range, a good match is assured.

Figure 9:
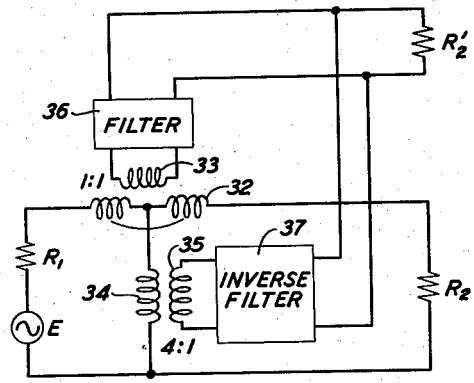

Substantially the same performance is obtainable from the circuit shown in Fig. 9, where the outputs of filters 36 and 37 are in parallel. Such a connection requires the presence of the transformer in the shunt branch but permits on ground operation of the amplifier and both filters. As shown, the transformer turns ratios are changed to 1:1 and 4:1, respectively, to preserve the original impedance relationships.

Figure 10:
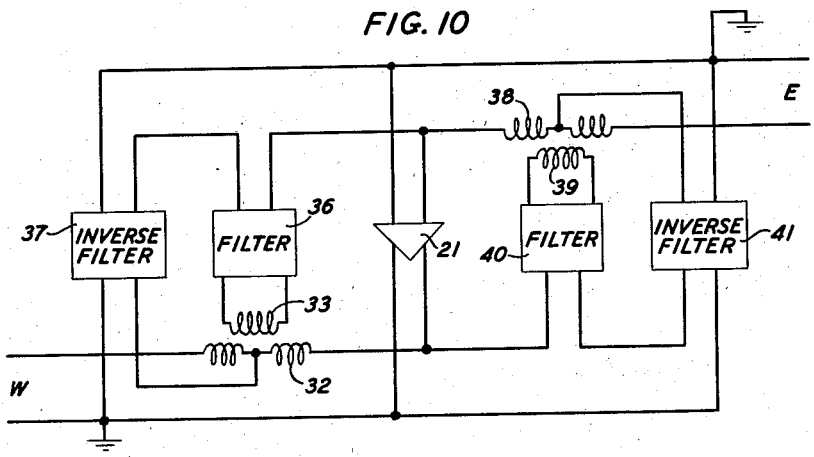
Fig. 10 shows a complete 21-type repeater embodying the invention.

Fig. 10 illustrates a complete 21-type repeater embodying the invention. The illustrated circuit resembles those of Figs. 1 and 2 in that it contains a single one-way amplifier 21 to amplify carrier wave energy transmitted in both directions. It differs, however, in that, in accordance with the present invention, the transmission lines W and E are connected to respectively opposite sides of the amplifier by bridged-T band-splitting networks like that shown in Fig. 8. The primary winding 32 of a first transformer is connected in series in one side of the W line, the secondary winding 33 of the same transformer is connected across one side of a filter circuit 36, one side of a second filter circuit 37 inverse to filter 36 is connected between the mid-point of winding 32 and the other side of line W (e.g., ground), and the outputs of both filters are connected in series in the manner of Fig. 8 and coupled to the input side of amplifier 21. Beyond the transformer, line W itself (representing the output side of the bridged-T band-splitting network featured by the invention) is coupled to the output side of amplifier 21. The other side of the embodiment of the invention shown in Fig. 10 is much the same as that which has already been described. A second transformer has a primary winding 38 and a secondary winding 39 corresponding to windings 32 and 33, respectively, and a pair of inverse filters 40 and 41 correspond to filters 36 and 37, respectively.

In the embodiment of the invention illustrated in Fig. 10, each pair of inverse filters may, by way of example, take the form of the respectively inverse high-pass filters shown in Figs. 5A and 5B. The high frequency signal path through the repeater is then from W to E through filters 36 and 37, amplifier 21, and filters 40 and 41. The low frequency signal path, on the other hand, is then from E to W directly through amplifier 21.

Figure 11A:
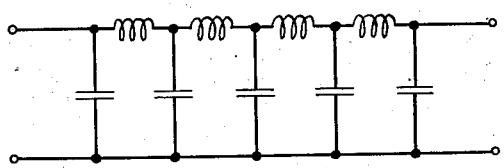
Figure 11B:
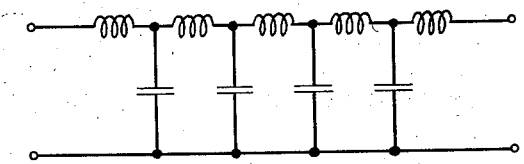

Although high-pass filters have been dealt with primarily in setting forth the novel aspects of the invention, inverse low-pass or band-pass filter circuits may also be used to achieve substantially the same advantages. A pair of mutually inverse low-pass filters suitable for use as filters 36 and 40 and filters 37 and 41, respectively, are shown in Figs. 11A and 11B, while a pair of mutually inverse band-pass filters which may be used are shown in Figs. 12A and 12B. In each instance, the respective filters have like cut-off frequencies.

While the embodiment of the invention illustrated in Fig. 10 presents impedances to both lines that are substantially constant resistances, the impedances presented to the input and output sides of amplifier 21 are not. For those circumstances under which it is important that good impedance matches be obtained within as well as without a 21-type repeater, the embodiment of the invention shown in Fig. 13 may be used. At the cost of two extra transformers and two terminating resistors, the embodiment of the invention shown in Fig. 13 provides substantially constant resistances facing the internal one-way amplifier 21 as well as two-way lines E and W.

In Fig. 13, the connection between line W and the output side of amplifier 21 is the same as in Fig. 10. The output sides of inverse filters 36 and 37, however, instead of being connected in series or in parallel to the input side of amplifier 21, are connected to mutually conjugate terminals of a hybrid network which includes a transformer having primary and secondary windings 42 and 43 and a terminating resistor 44. Secondary winding 43 is connected across the output side of filter 36, while primary winding 42 and terminating resistor 44 are connected in series across the input of amplifier 21. The output side of filter 37 is connected between the midpoint of winding 42 and the end of resistor 44 remote from winding 42.

The connection between line E and amplifier 21 in Fig. 13 is the same as that from line W which has just been described. Windings 38 and 39 and inverse filters 40 and 41 are the same as in Fig. 10. Instead of being connected together to the output side of amplifier 21, however, filters 40 and 41 are connected to conjugate terminals of a hybrid network which includes a transformer having primary and secondary windings 45 and 46 and a terminating resistor 47. The connections are substantially the same as on the other side of the repeater, with the exception that primary winding 45 and terminating resistor 47 are connected in series across the output side instead of the input side of amplifier 21.

The 21-type repeater illustrated in Fig. 14 represents still another embodiment of the invention and takes advantage of the structural characteristics of band-pass filters like those shown in Figs. 12A and 12B in order to achieve a circuit simplification. As has already been noted, inverse band-pass filters like those of Figs. 12A and 12B can readily be employed as filters 36 and 40 and filters 37 and 41, respectively, in the embodiment of the invention shown in Fig. 10. In some instances, the use of such band-pass filters makes it possible to absorb the transformers into the filter structures. In the embodiment of the invention shown in Fig. 14, filters 36 and 40 are connected directly across windings 32 and 38, respectively, and the transformer secondary windings are eliminated. The range of permissible filter cutoff frequencies tends to be restricted somewhat by such an arrangement, but the resulting circuit simplification is advantageous whenever the transmitted signal bands permit such a restriction to be imposed.

The embodiment of the invention illustrated in Fig. 14 operates in substantially the same manner as that shown in Fig. 10, with carrier signals within the pass band of the filters in frequency traveling from W to E and those without the pass band traveling from E to W. A substantially constant resistance is presented to both lines and filter discrimination requirements are relaxed in the manner which has already been described.

In the 21-type repeater embodiments of the invention which have been described, it is not always essential that the same type of filters be used to connect to both the E and W lines. In the arrangement of Fig. 10, for example, the same band-splitting results may be obtained with high-pass filters on the left-hand side of amplifier 21 and low-pass filters on the right-hand side, provided that one of the bridged-T networks is effectively inverted in order to preserve the respective high and low frequency signal paths in their original form.

It is to be understood that the above-described arrangements are illustrative of the application of the principles of the invention. Numerous other arrangements may be devised by those skilled in the art without departing from the spirit and scope of the invention.

What is claimed is:

1. In combination with a pair of transmission line sections, a two-way carrier repeater which comprises a one-way amplifier having an input circuit and an output circuit, a first wave transmission network of the bridged-T type connected between a first of said line sections and said amplifier input circuit and having mutually conjugate transmission paths connected from its respective bridging and shunt impedance branches to said amplifier output circuit, a second wave transmission network of the bridged-T type connected between the second of said line sections and said amplifier output circuit and having mutually conjugate transmission paths connected from its respective bridging and shunt impedance branches to said amplifier input circuit, a pair of filter circuits of mutually inverse structure with respect to each other connected in respective ones of said conjugate transmission paths of said first transmission network, and a pair of filter circuits of mutually inverse structure with respect to each other connected in respective ones of said conjugate transmission paths of said transmission network, whereby wave energy traveling in one direction through said repeater within the pass band of said filter circuits and wave energy traveling in the opposite direction through said repeater outside of the pass band of said filter circuits both traverse said one-way amplifier in the same direction.

2. A combination in accordance with claim 1 in which all of said filters are high-pass filters.

3. A combination in accordance with claim 1 in which all of said filters are low-pass filters.

4. A combination in accordance with claim 1 in which all of said filters are band-pass filters.

5. In combination with a pair of transmission line sections, a two-way carrier repeater which comprises a one-way amplifier having an input circuit and an output circuit, a first hybrid branching circuit having two pairs of mutually conjugate transmission paths and having one pair of said conjugate paths respectively connected to one of said line sections and said amplifier input circuit, a second hybrid branching circuit having two pairs of mutually conjugate transmission paths and having one pair of said conjugate paths respectively connected to the other of said line sections and said amplifier output circuit, a first pair of mutually inverse filter circuits having the same pass band connected from respective ones of the remaining pair of conjugate paths of said first hybrid circuit to said amplifier output circuit, and a second pair of mutually inverse filter circuits having said same pass band connected from respective ones of the remaining pair of conjugate paths of said second hybrid circuit to said amplifier input circuit, whereby wave energy traveling in one direction through said repeater within the pass band of said filter circuits and wave energy traveling in the opposite direction through said repeater outside of the pass band of said filter circuits both traverse said one-way amplifier in the same direction.

6. In combination with a pair of transmission line sections, a two-way carrier repeater which comprises a one-way amplifier, a first hybrid branching circuit having two pairs of mutually conjugate transmission paths and having one pair of said conjugate paths respectively connected to one of said line sections and one side of said amplifier, a first pair of mutually inverse filter circuits having the same pass band connected to provide substantially loss-free transmission paths within their said pass band between respective ones of the remaining pair of conjugate paths of said first hybrid circuit and the other side of said amplifier, a second hybrid branching circuit having two pairs of mutually conjugate transmission paths and having one pair of said conjugate paths respectively connected to the other of said line sections and one side of said amplifier, and a second pair of mutually inverse filter circuits having substantially the same pass band connected to provide substantially loss-free transmission paths within their said pass band between respective ones of the remaining pair of said conjugate paths of said second hybrid circuit and the side of said amplifier electrically remote from said second hybrid circuit.

7. A combination in accordance with claim 6 in which the sides of said first pair of filters electrically remote from said first hybrid circuit are connected in series with each other across their respective side of said amplifier and the sides of said second pair of filters electrically remote from said second hybrid circuit are connected in series with each other across their respective side of said amplifier.

8. A combination in accordance with claim 6 in which the sides of said fisrt pair of filters electrically remote from said first hybrid circuit are connected in parallel with each other across their respective side of said amplifier and the sides of said second pair of filters electrically remote from said second hybrid circuit are connected in parallel with each other across their respective side of said amplifier.

9. In combination with a pair of transmission line sections, a two-way carrier repeater which comprises a one-way amplifier, a first wave transmission network of the bridged-T type connected between one of said line sections and one side of said amplifier, a second wave transmission network of the bridged-T type connected between the other of said line sections and one side of said amplifier, each of said transmission networks comprising a first filter circuit, a second filter circuit of inverse structure with respect to and having the same pass band as said first filter circuit, a transformer having a first winding connected in series with one side of the respective one of said line sections and a second winding connected across one side of said first filter circuit, and means connecting one side of said second filter circuit between an intermediate point on said first winding and the other side of said line section, a substantially loss-free transmission path between the other sides of said filter circuits of said first transmission network and the side of said amplifier electrically remote from said first transmission network, and a substantially loss-free transmission path between the other sides of said filter circuits of said second transmission network and the side of said amplifier electrically remote from said second transmission network, said other sides of said filter circuits of said first transmission network being connected in circuit with each other across their respective side of said amplifier and said other sides of said filter circuits of said second transmission network being connected in circuit with each other across their respective side of said amplifier.

10. In combination with a pair of transmission line sections, a two-way carrier repeater which comprises a one-way amplifier having an input circuit and an output circuit, a first transmission wave network of the bridged-T type connected between one of said line sections and said amplifier input circuit, a second wave transmission network of the bridged-T type connected between the other of said line sections and said amplifier output circuit, each of said transmission networks comprising a first filter circuit, a second filter circuit of inverse structure with respect to and having the same pass band as said first filter circuit, a transformer having a first winding connected in series with one side of the respective one of said line sections and a second winding connected across one side of said first filter circuit, and means connecting one side of said second filter circuit between an intermediate point on said first winding and the other side of said line section, said filter circuits in both of said transmission networks having the same pass band, a substantially loss-free transmission path between the other sides of said filter circuits of said first transmission network and said amplifier output circuit, and a substantially loss-free transmission path between the other sides of said filter circuits of said second transmission network and said amplifier input circuit, said other sides of said filter circuits of said first transmission network being connected in circuit with each other across said amplifier output circuit and said other sides of said filter circuits of said second transmission network being connected in circuit with each other across said amplifier input circuit, whereby wave energy traveling in one direction through said repeater within the pass band of said filter circuits and wave energy traveling in the opposite direction through said repeater outside of the pass band of said filter circuits both traverse said one-way amplifier in the same direction.

11. In combination with a pair of transmission line sections, a two-way carrier repeater which comprises a one-way amplifier having an input circuit and an output circuit, a first wave transmission network of the bridged-T type connected between one of said line sections and said amplifier input circuit and having mutually conjugate arms defined by its respective bridging and shunt impedance branches, a second wave transmission network of the bridged-T type connected between the other of said line sections and said amplifier output circuit and having mutually conjugate arms defined by its respective bridging and shunt impedance branches, a first pair of filter circuits having mutually inverse structure with respect to each other and substantially the same pass band connected to form substantially loss-free transmission paths within their said pass band from the respective bridging and shunt impedance branches of said first wave transmission network to said amplifier output circuit, and a second pair of filter circuits having mutually inverse structure with respect to each other and substantially said same pass band connected to form substantially loss-free transmission paths within their said pass band from the respective bridging and shunt impedance branches of said second wave transmission network to said amplifier input circuit, whereby wave energy traveling in one direction through said repeater within the pass band of said filter circuits and wave energy traveling in the opposite direction through said repeater outside of the pass band of said filter circuits both traverse said one-way amplifier in the same direction.

12. A combination in accordance with claim 11 in which the sides of said first pair of filter circuits electrically nearer said amplifier are connected in series with each other across said amplifier output circuit and the sides of said second pair of filter circuits electrically nearer said amplifier are connected in series with each other across said amplifier input circuit.

13. A combination in accordance with claim 11 in which the sides of said first pair of filter circuits electrically nearer said amplifier are connected in parallel with each other across said amplifier output circuit and the sides of said second pair of said filter circuits electrically nearer said amplifier are connected in parallel with each other across said amplifier input circuit.

References Cited in the file of this patent

UNITED STATES PATENTS

| 1,920,041 | Vos et al. | July 25, 1933 |
| 2,039,202 | Vos et al. | Apr. 28, 1936 |
| 2,044,047 | Bobis | June 16, 1936 |